United States Patent
Yao et al.

(10) Patent No.: US 12,533,638 B2
(45) Date of Patent: Jan. 27, 2026

(54) SEPARATION MEMBRANE BASED ON REACTIVE SUPPORT LAYER, PREPARATION METHOD AND APPLICATION

(71) Applicant: ZHEJIANG UNIVERSITY, Hangzhou (CN)

(72) Inventors: Zhikan Yao, Hangzhou (CN); Lin Zhang, Hangzhou (CN); Yukun Qian, Hangzhou (CN); Jing Wang, Hangzhou (CN); Ge Li, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 258 days.

(21) Appl. No.: 18/278,401

(22) PCT Filed: Mar. 20, 2023

(86) PCT No.: PCT/CN2023/082464
§ 371 (c)(1),
(2) Date: Aug. 22, 2023

(87) PCT Pub. No.: WO2023/179530
PCT Pub. Date: Sep. 28, 2023

(65) Prior Publication Data
US 2025/0010245 A1    Jan. 9, 2025

(30) Foreign Application Priority Data

Mar. 22, 2022 (CN) .......................... 202210286734.5
Mar. 22, 2022 (CN) .......................... 202210287997.8

(51) Int. Cl.
*B01D 67/00* (2006.01)
*B01D 61/02* (2006.01)
(Continued)

(52) U.S. Cl.
CPC ....... *B01D 67/0006* (2013.01); *B01D 61/025* (2013.01); *B01D 61/027* (2013.01);
(Continued)

(58) Field of Classification Search
CPC .. B01D 61/025; B01D 61/027; B01D 61/145; B01D 67/0006; B01D 69/105;
(Continued)

(56) References Cited

U.S. PATENT DOCUMENTS

2015/0290595 A1* 10/2015 Reddy ................ B01D 67/0088
                                                          210/489
2016/0151748 A1    6/2016 Meier-Haack et al.

FOREIGN PATENT DOCUMENTS

CN    104474925    4/2015
CN    106731908    5/2017
(Continued)

OTHER PUBLICATIONS

Wang, et al., "Aminolytic depolymerization of polyarylsulfones," Polymer Degradation & Stability, 103:69-74 (Year: 2014).*
(Continued)

*Primary Examiner* — Patrick Orme
(74) *Attorney, Agent, or Firm* — Jiwen Chen; Joywin IP Law PLLC (57) ABSTRACT

The present invention discloses a separation membrane based on a reactive support layer, a preparation method and an application, and belongs to the technical field of water treatment membranes. The preparation method includes: (1) subjecting a porous support membrane to an amino grafting reaction to prepare a reactive support membrane; and (2) subjecting an aqueous phase solution and an oil phase solution containing a multi-membered acyl chloride oil phase monomer to interfacial polymerization on the reactive support membrane to prepare a separation membrane based
(Continued)

on a reactive support layer; where an aqueous phase monomer in the aqueous phase solution is a semi-aromatic amine or an aromatic amine. In the present invention, the porous support membrane is subjected to the amino grafting reaction to obtain the reactive support membrane, and the interface polymerization is carried out on a surface of the reactive support membrane. Due to the reactive support membrane, a structure of a formed polyamide separation layer can be changed, thereby improving the water permeability of a polyamide separation membrane and maintaining an ion retention property or the ion selectivity thereof. The method of the present invention has the advantages of a simple process, low requirements for equipment and convenience in industrial production, and the prepared high-performance separation membrane has a wide application prospect in the field of water treatment.

6 Claims, 2 Drawing Sheets

(51) Int. Cl.
*B01D 61/14* (2006.01)
*B01D 69/10* (2006.01)
*B01D 71/56* (2006.01)
*C02F 1/44* (2023.01)

(52) U.S. Cl.
CPC ........ *B01D 61/145* (2013.01); *B01D 69/105* (2013.01); *B01D 71/56* (2013.01); *C02F 1/441* (2013.01); *C02F 1/442* (2013.01); *C02F 1/444* (2013.01)

(58) Field of Classification Search
CPC ................ B01D 69/1251; B01D 71/56; B01D 2323/38; C02F 1/441; C02F 1/442; C02F 1/444
See application file for complete search history.

(56) References Cited

FOREIGN PATENT DOCUMENTS

| CN | 106731908 | A | * | 5/2017 | ............ B01D 71/82 |
|----|-----------|---|---|--------|------------------------|
| CN | 109718667 |   |   | 5/2019 |                        |
| CN | 112844079 |   |   | 5/2021 |                        |
| CN | 112844079 | A | * | 5/2021 | ............ B01D 71/56 |
| CN | 113750818 |   |   | 12/2021 |                       |
| CN | 113856492 |   |   | 12/2021 |                       |

OTHER PUBLICATIONS

CN106731908A—EPO Machine Translation (Year: 2025).*
CN112844079A—EPO Machine Translation (Year: 2025).*

* cited by examiner

SEPARATION MEMBRANE BASED ON REACTIVE SUPPORT LAYER, PREPARATION METHOD AND APPLICATION

This is a U.S. national stage application of PCT Application No. PCT/CN2023/082464 under 35 U.S.C. 371, filed Mar. 20, 2023 in Chinese, claiming priority of Chinese Application No. 202210287997.8, filed Mar. 22, 2022 and No. 202210286734.5, filed Mar. 22, 2022, all of which are hereby incorporated by reference.

FIELD OF TECHNOLOGY

The present invention relates to the technical field of water treatment membranes, and specifically relates to a separation membrane based on a reactive support layer, a preparation method and an application.

BACKGROUND TECHNOLOGY

With rapid development of the economy and the society and continuous advancement of the urbanization process, shortage of total water resources and time-space matching contradiction are increasingly obvious. As a water treatment technology with high efficiency, energy conservation and environmental protection, a membrane separation technology has become an important technology to solve the problems of shortage of water resources and sewage treatment. Reverse osmosis membranes and nanofiltration membranes are commonly used functional semipermeable membranes. The reverse osmosis membranes are used as a core of a reverse osmosis technology. According to the reverse osmosis technology, a pressure difference between two sides of a membrane is used as a driving force, and a membrane process of separation is realized by means of selective permeability of the semipermeable membrane. As a reverse osmosis process is free of phase change and has low energy consumption, the reverse osmosis technology plays an important role in desalination of seawater and brackish water, preparation of pure water and ultrapure water and other aspects. The nanofiltration membranes are used as a core of a nanofiltration technology. The nanofiltration technology is a novel separation technology between reverse osmosis and ultrafiltration, is applicable to operating at a lower operating pressure, and has lower energy consumption and cost, thereby being more suitable for treatment of industrial softened water.

As the reverse osmosis is a pressure-driven separation process, the operating pressure thereof is required to be greater than the osmotic pressure of concentrated brine. Thus, it is difficult to reduce energy consumption. Therefore, under same operating conditions, while a certain high desalination rate is ensured, increase of water fluxes of the reverse osmosis membranes is an inevitable choice to reduce operating costs. In addition, as requirements for membrane elements with high fluxes and high water quality on the market are increasingly strict at present, it is necessary to develop reverse osmosis composite membranes with high fluxes and high salt ion retention rates.

The nanofiltration membranes usually have a pore size of about a few nanometers, which can effectively remove bivalent ions and higher valent ions in solutions and substances with relative molecular weights greater than 200, thus having better separation performance than ultrafiltration membranes and microfiltration membranes. At present, as recycling of wastewater has a high market value, nanofiltration membrane products meeting the requirements of highest monovalent or bivalent ion retention and resolution rates and high water fluxes are required for separation and concentration of high-salinity wastewater, so as to improve separation efficiency of mixed components as much as possible.

At present, most commercial separation membranes have composite structures of aromatic polyamides, which are three-layer structures including a polyamide separation layer, a porous support layer and a non-woven fabric base. The polyamide separation layer is crucial to the separation performance of the membranes, and regulation and design of a molecular structure of the polyamide separation layer, control of an interface polymerization process and the like are of great significance to improve properties of the membranes. In recent years, most studies have been focused on such aspects. However, the support layer is used as a carrier during interfacial polymerization at the same time, and characteristics thereof (pore size, roughness, hydrophilicity and the like) also have a great impact on the interfacial polymerization process and structures of the membranes.

According to a Chinese patent document with a publication No. CN113600040A, a polyethylene-based reverse osmosis membrane with a high flux is disclosed. The reverse osmosis membrane includes a hydrophilic polyethylene porous support layer, an intermediate layer and a polyamide desalination layer formed on the intermediate layer, where the intermediate layer is prepared by coating the hydrophilic polyethylene porous support layer with a mixed solution of a benzene compound containing amino and sulfo, poly-2-ethyl-2-oxazoline and poly(ethylene glycol) diglycidyl ether and then performing a heating reaction. The polyethylene-based reverse osmosis membrane prepared by the present invention has an obviously higher flux and a higher desalination rate. However, various raw materials are used, and a complex process is adopted.

According to a Chinese patent document with a publication No. CN109847586A, a method for preparing a reverse osmosis membrane with a high flux is disclosed. In the present invention, a casting solution with an inorganic silicate nanomaterial dispersed therein is coated on a support material to obtain a base membrane. Further, the base membrane is immersed in a suspension of dopamine/ZIF-8 to obtain a base membrane with a dopamine/ZIF-8 intermediate nanolayer. Then, the modified base membrane is immersed in an aqueous phase solution and an organic phase solution for interfacial polymerization to prepare a functional layer so as to obtain a primary membrane. Then, the primary membrane is immersed in water for dissolution to remove the intermediate nanolayer so as to obtain the reverse osmosis membrane with a high flux. The method can greatly increase the flux without affecting a desalination property, but have cumbersome steps.

According to a Chinese patent document with a publication No. CN111437732A, a method for preparing a nanofiltration membrane with high selectivity and a high flux is disclosed. In the present invention, a polyamide ultrathin separation layer is formed on a porous support layer by adding one or more of alkyl acids into an aqueous phase formula solution containing a polyamine to regulate the pH value of an aqueous phase, and then subjecting the aqueous phase and an aromatic multi-membered acyl chloride solution of an organic phase monomer to an interfacial reaction. The composite nanofiltration membrane prepared by the method of the present invention has a high water flux, a high sulfate retention rate, and a high chloride ion retention rate of greater than 30%. Thus, the ion selectivity needs to be improved.

According to a Chinese patent document with a publication No. CN109126463A, a method for preparing a high-flux nanofiltration membrane containing a microporous intermediate layer is disclosed. The method includes dispersing and coating a microporous material on a porous support layer to form an intermediate layer, and performing interfacial polymerization on the intermediate layer to prepare the composite nanofiltration membrane. The intermediate layer of the nanofiltration membrane of the present invention has a uniform pore structure, which significantly improves the water permeability of the nanofiltration membrane. However, due to introduction of the intermediate layer, the thickness of the nanofiltration membrane is increased.

SUMMARY OF THE INVENTION

The present invention provides a method of preparing a separation membrane based on a reactive support layer. The separation membrane is a reverse osmosis membrane or a nanofiltration membrane. The method has a simple process and low requirements for equipment. By modifying a porous support membrane with reaction inertness, the water permeation resistance is decreased, and the water flux of the separation membrane is increased.

Specific technical schemes adopted are as follows.

A method of preparing a separation membrane based on a reactive support layer is provided, where the separation membrane is a reverse osmosis membrane, and the method includes the following steps:
  (1) subjecting a porous support membrane to an amino grafting reaction to prepare a reactive support membrane; and
  (2) subjecting an aqueous phase solution and an oil phase solution containing a multi-membered acyl chloride oil phase monomer to interfacial polymerization on the reactive support membrane to prepare a separation membrane based on a reactive support layer;
  where in the aqueous phase solution, an aqueous phase monomer is at least one of m-phenylenediamine, o-phenylenediamine, 1,3,5-trisaminobenzene, 1,2,4-trisaminobenzene, 3,5-diaminobenzoic acid, 2,4-diaminotoluene, 2,6-diaminotoluene and dimethylphenylene diamine.

Alternatively, a method of preparing a separation membrane based on a reactive support layer is provided, where the separation membrane is a nanofiltration membrane, and the method includes the following steps:
  (1) subjecting a porous support membrane to an amino grafting reaction to prepare a reactive support membrane; and
  (2) subjecting an aqueous phase solution and an oil phase solution containing a multi-membered acyl chloride oil phase monomer to interfacial polymerization on the reactive support membrane to prepare a separation membrane based on a reactive support layer;
  where in the aqueous phase solution, an aqueous phase monomer is at least one of piperazine, 2-methylpiperazine, 2,5-dimethylpiperazine, 2,6-dimethylpiperazine, 1,2-diaminocyclohexane, 1,4-diaminocyclohexane, ethylenediamine, N,N-bis(2-aminoethyl)ethylenediamine, divinyltriamine and polyethyleneimine.

The porous support membrane includes a non-woven fabric layer and a porous support layer, and is selected from one of a polysulfone ultrafiltration membrane, a polyether sulfone ultrafiltration membrane, a polyacrylonitrile ultrafiltration membrane, a polyvinylidene fluoride ultrafiltration membrane, a polypropylene ultrafiltration membrane, a polyethylene ultrafiltration membrane, a polystyrene ultrafiltration membrane or a polyimide ultrafiltration membrane.

In the present invention, by subjecting the porous support membrane to the amino grafting reaction, an amino group is introduced onto the porous support layer with reaction inertness to construct the reactive support membrane, and then the interfacial polymerization is performed on a surface of the reactive support membrane. When the aqueous phase monomer in the aqueous phase solution is a rigid monomer such as an aromatic amine, the prepared separation membrane is a dense reverse osmosis membrane. When the aqueous phase monomer in the aqueous phase solution is a flexible monomer such as a semi-aromatic amine, the prepared membrane is a relatively loose nanofiltration membrane. In general, a reverse osmosis membrane is prepared from a monomer with a higher concentration, while a nanofiltration membrane is prepared from a monomer with a lower concentration.

The reactive support membrane can change a structure of a formed polyamide separation layer, thereby improving the water permeability of the separation membrane. Specifically, when the separation membrane is a reverse osmosis membrane, the reactive support membrane can improve the water permeability of a polyamide reverse osmosis membrane and maintain the stability of an ion retention property thereof. When the separation membrane is a nanofiltration membrane, the reactive support membrane can improve the water permeability of a polyamide nanofiltration membrane and improve the ion selectivity thereof.

Preferably, the porous support membrane is immersed in a reaction solution containing an amino monomer to carry out the amino grafting reaction, and the amino monomer is at least one of ethylenediamine, hexamethylenediamine, diethylenetriamine, triethylenetetramine, tetraethylenepentamine, pentaethylenehexamine and polyethyleneimine; and the amino monomer has a content of 10-15 wt % in the reaction solution containing an amino monomer. When the content of the amino monomer is too high, an ammonolysis rate is too high, and it is difficult to control the content of amino grafted on the surface of the porous support membrane; and when the content of the amino monomer is too low, the problem of incomplete grafting or long grafting time is easily caused.

Further preferably, the amino grafting reaction is carried out at a temperature of 90-160° C. for 24-72 hours.

In the oil phase solution, the oil phase monomer is at least one of trimesoyl chloride, p-phthaloyl chloride, o-phthaloyl chloride, tetramesoyl chloride, malonyl dichloride, glutaryl chloride and fumaryl chloride, and a solvent of the oil phase monomer is at least one of n-hexane, cyclohexane, n-heptane, toluene, benzene, isopar G, isopar E, isopar H, isopar L and isopar M.

Preferably, the aqueous phase monomer has a content of 0.1-0.5 wt % in the aqueous phase solution, and the oil phase monomer has a content of 0.01-0.05 wt % in the oil phase solution.

Preferably, in step (2), the interfacial polymerization process for membrane preparation includes:
  1) pouring the aqueous phase solution onto a surface of the reactive support membrane, subjecting the aqueous phase solution to contacting and standing for 1-10 min, and then removing an excess liquid on the surface of the membrane;

2) pouring the oil phase solution containing a multi-membered acyl chloride oil phase monomer onto the surface of the membrane obtained in step 1), subjecting the oil phase solution to contacting and standing for 0.5-5 min, and then removing an excess liquid on the surface of the membrane; and 3) subjecting the membrane obtained in step 2) to heat treatment in a water bath to obtain a separation membrane based on a reactive support layer.

According to the method of the present invention, the interfacial polymerization reaction is carried out on the reactive support membrane to prepare a polyamide separation layer. An amino group introduced onto the reactive support membrane can react with the multi-membered acyl chloride oil phase monomer and participate in the interfacial polymerization process, thus preventing the generation of defects in a forming process of the polyamide separation layer. Meanwhile, due to the reactive support membrane with the amino group introduced thereto, the polyamide layer can be prevented from infiltrating into pores of the support layer, the actual thickness of the formed polyamide separation layer is decreased, the water permeation resistance is decreased, and the water permeability of the membrane can be greatly improved while a salt retention rate or the ion selectivity is ensured.

Preferably, in step 3), the heat treatment in the water bath is performed at 50-80° C. for 5-20 min.

The present invention further provides a separation membrane based on a reactive support layer prepared by the method of preparing a separation membrane based on a reactive support layer.

The separation membrane based on a reactive support layer includes a non-woven fabric layer, a reactive support layer and a polyamide separation layer. When the separation membrane is a reverse osmosis membrane, the separation membrane has a water flux of greater than 43 $L·m^{-2}·h^{-1}$ and a retention rate of greater than 97% for a 2,000 ppm sodium chloride solution; and when the separation membrane is a nanofiltration membrane, the separation membrane has a water flux of greater than 18 $L·m^{-2}·h^{-1}·bar^{-1}$, good ion selectivity, a bivalent anion retention rate of greater than 90% and a monvalent anion retention rate of less than 25%.

The present invention further provides an application of the separation membrane based on a reactive support layer in the field of water treatment. In particular, a reverse osmosis membrane based on a reactive support layer can be used in the fields of desalination of seawater, preparation of ultrapure water, recycling of reclaimed water, treatment of municipal wastewater and the like. A nanofiltration membrane based on a reactive support layer can be used in the fields of softening of hard water, removal of organic compounds and the like.

Compared with the prior art, the present invention has the following beneficial effects.

(1) According to the method of the present invention, as the amino grafting reaction is carried out to prepare the reactive support membrane containing an amino group, the original porous support membrane with reaction inertness can also participate in the interfacial polymerization reaction to provide more polymerization reaction sites, thus preventing the generation of defects in a forming process of a polyamide separation layer. Moreover, due to presence of the reactive support membrane, the polyamide layer is further prevented from infiltrating into pores of the support layer, the actual thickness of the polyamide layer is decreased, and the water permeation resistance is decreased. Therefore, a reverse osmosis membrane prepared has a high flux and an excellent salt retention ability; and a nanofiltration membrane prepared has a high flux and a bivalent anion retention ability, and has effective separation and selection abilities.

(2) The method of the present invention has low requirements for equipment. The method for preparing the reactive support membrane is simple, which is convenient to make improvement on the basis of a traditional preparation process for a polyamide reverse osmosis composite membrane, so as to realize preparation and production in a large scale. A high-performance reverse osmosis membrane prepared or a high-performance nanofiltration membrane prepared has a wide application prospect in the field of water treatment.

(3) The separation membrane based on a reactive support layer provided by the present invention has a high flux and excellent properties. When the separation membrane is a reverse osmosis membrane, the separation membrane has a water flux of greater than 43 $L·m^{-2}·h^{-1}$, a retention rate of greater than 97% for a 2,000 ppm sodium chloride solution and a strong salt retention ability; and when the separation membrane is a nanofiltration membrane, the separation membrane has a water flux of greater than 18 $L·m^2·h^{-1}·bar^{-1}$, good ion selectivity, a bivalent anion retention rate of greater than 90% and a monvalent anion retention rate of less than 25%.

DETAILED DESCRIPTION OF THE EMBODIMENTS

The present invention is further illustrated below in combination with examples and attached drawings. It is to be understood that these examples are used only to illustrate the present invention, rather than to limit the scope of the present invention.

Example 1

Commercial polyether sulfone ultrafiltration membrane was used as a porous support membrane. The porous support membrane was immersed in an aqueous solution containing 10 wt % of diethylenetriamine, subjected to an amination grafting reaction at 90° C. for 24 hours and then taken out. A surface of the membrane was sequentially washed with anhydrous ethanol and deionized water to obtain a reactive support membrane containing amino on the surface. Then, an aqueous solution containing 0.1 wt % of m-phenylenediamine was poured onto the surface of the reactive support membrane, followed by contacting and standing for 1 min, the excess solution was poured away, and a residual liquid on the surface was removed. Then, an n-hexane solution containing 0.01 wt % of trimesoyl chloride was poured onto the surface of the membrane, followed by contacting and standing for 0.5 min, the excess solution was poured away, and a residual liquid on the surface was removed. Then, the obtained membrane was subjected to heat treatment in a water bath at 50° C. for 5 min to obtain a separation membrane based on a reactive support layer, which was a reverse osmosis membrane.

Example 2

Commercial polyether sulfone ultrafiltration membrane was used as a porous support membrane. The porous support membrane was immersed in an aqueous solution containing 15 wt % of diethylenetriamine, subjected to an amination grafting reaction at 90° C. for 24 h and then taken out. A surface of the membrane was sequentially washed with anhydrous ethanol and deionized water to obtain a reactive support membrane containing amino on the surface. Then, an aqueous solution containing 0.1 wt % of m-phenylenediamine was poured onto the surface of the reactive support membrane, followed by contacting and standing for 2 min, the excess solution was poured away, and a residual liquid on the surface was removed. Then, an n-hexane solution containing 0.01 wt % of trimesoyl chloride was poured onto the surface of the membrane, followed by contacting and standing for 1 min, the excess solution was poured away, and a residual liquid on the surface was removed. Then, the obtained membrane was subjected to heat treatment in a water bath at 80° C. for 20 min to obtain a separation membrane based on a reactive support layer, which was a reverse osmosis membrane.

Example 3

Commercial polyether sulfone ultrafiltration membrane was used as a porous support membrane. The porous support membrane was immersed in an aqueous solution containing 15 wt % of ethylenediamine, subjected to an amination grafting reaction at 160° C. for 72 hours and then taken out. A surface of the membrane was sequentially washed with anhydrous ethanol and deionized water to obtain a reactive support membrane containing amino on the surface. Then, an aqueous solution containing 0.5 wt % of m-phenylenediamine was poured onto the surface of the reactive support membrane, followed by contacting and standing for 10 min, the excess solution was poured away, and a residual liquid on the surface was removed. Then, an n-hexane solution containing 0.05 wt % of trimesoyl chloride was poured onto the surface of the membrane, followed by contacting and standing for 5 min, the excess solution was poured away, and a residual liquid on the surface was removed. Then, the obtained membrane was subjected to heat treatment in a water bath at 80° C. for 10 min to obtain a separation membrane based on a reactive support layer, which was a reverse osmosis membrane.

Example 4

Commercial polyether sulfone ultrafiltration membrane was used as a porous support membrane. The porous support membrane was immersed in an aqueous solution containing 10 wt % of hexamethylenediamine, subjected to an amination grafting reaction at 160° C. for 72 hours and then taken out. A surface of the membrane was sequentially washed with anhydrous ethanol and deionized water to obtain a reactive support membrane containing amino on the surface. Then, an aqueous solution containing 0.1 wt % of dimethylphenylene diamine was poured onto the surface of the reactive support membrane, followed by contacting and standing for 5 min, the excess solution was poured away, and a residual liquid on the surface was removed. Then, an n-hexane solution containing 0.01 wt % of trimesoyl chloride was poured onto the surface of the membrane, followed by contacting and standing for 3 min, the excess solution was poured away, and a residual liquid on the surface was removed. Then, the obtained membrane was subjected to heat treatment in a water bath at 80° C. for 20 min to obtain a separation membrane based on a reactive support layer, which was a reverse osmosis membrane.

Example 5

Commercial polysulfone ultrafiltration membrane was used as a porous support membrane. The porous support membrane was immersed in an aqueous solution containing 15 wt % of diethylenetriamine, subjected to an amination grafting reaction at 90° C. for 24 hours and then taken out. A surface of the membrane was sequentially washed with anhydrous ethanol and deionized water to obtain a reactive support membrane containing amino on the surface. Then, an aqueous solution containing 0.5 wt % of m-phenylenediamine was poured onto the surface of the reactive support membrane, followed by contacting and standing for 1 min, the excess solution was poured away, and a residual liquid on the surface was removed. Then, an n-hexane solution containing 0.05 wt % of trimesoyl chloride was poured onto the surface of the membrane, followed by contacting and standing for 0.5 min, the excess solution was poured away, and a residual liquid on the surface was removed. Then, the obtained membrane was subjected to heat treatment in a water bath at 50° C. for 20 min to obtain a separation membrane based on a reactive support layer, which was a reverse osmosis membrane.

Example 6

Commercial polysulfone ultrafiltration membrane was used as a porous support membrane. The porous support membrane was immersed in an aqueous solution containing 10 wt % of ethylenediamine, subjected to an amination grafting reaction at 90° C. for 72 hours and then taken out. A surface of the membrane was sequentially washed with anhydrous ethanol and deionized water to obtain a reactive support membrane containing amino on the surface. Then, an aqueous solution containing 0.5 wt % of m-phenylenediamine was poured onto the surface of the reactive support membrane, followed by contacting and standing for 10 min, the excess solution was poured away, and a residual liquid on the surface was removed. Then, an isopar G solution containing 0.05 wt % of trimesoyl chloride was poured onto the surface of the membrane, followed by contacting and standing for 5 min, the excess solution was poured away, and a residual liquid on the surface was removed. Then, the obtained membrane was subjected to heat treatment in a water bath at 80° C. for 5 min to obtain a separation membrane based on a reactive support layer, which was a reverse osmosis membrane.

Example 7

Commercial polyvinylidene fluoride ultrafiltration membrane was used as a porous support membrane. The porous support membrane was immersed in an aqueous solution containing 15 wt % of triethylenetetramine, subjected to an amination grafting reaction at 90° C. for 24 hours and then taken out. A surface of the membrane was sequentially washed with anhydrous ethanol and deionized water to obtain a reactive support membrane containing amino on the surface. Then, an aqueous solution containing 0.5 wt % of o-phenylenediamine was poured onto the surface of the reactive support membrane, followed by contacting and standing for 1 min, the excess solution was poured away, and a residual liquid on the surface was removed. Then, a cyclohexane solution containing 0.05 wt % of o-phthaloyl chloride was poured onto the surface of the membrane, followed by contacting and standing for 0.5 min, the excess solution was poured away, and a residual liquid on the surface was removed. Then, the obtained membrane was subjected to heat treatment in a water bath at 80° C. for 20 min to obtain a separation membrane based on a reactive support layer, which was a reverse osmosis membrane.

Example 8

Commercial polypropylene ultrafiltration membrane was used as a porous support membrane. The porous support membrane was immersed in an aqueous solution containing 15 wt % of ethylenediamine, subjected to an amination grafting reaction at 90° C. for 72 hours and then taken out. A surface of the membrane was sequentially washed with anhydrous ethanol and deionized water to obtain a reactive support membrane containing amino on the surface. Then, an aqueous solution containing 0.5 wt % of o-phenylenediamine was poured onto the surface of the reactive support membrane, followed by contacting and standing for 10 min, the excess solution was poured away, and a residual liquid on the surface was removed. Then, an n-hexane solution containing 0.05 wt % of p-phthaloyl chloride was poured onto the surface of the membrane, followed by contacting and standing for 5 min, the excess solution was poured away, and a residual liquid on the surface was removed. Then, the obtained membrane was subjected to heat treatment in a water bath at 80° C. for 20 min to obtain a separation membrane based on a reactive support layer, which was a reverse osmosis membrane.

Comparative Example 1

Commercial polyether sulfone ultrafiltration membrane was used as a porous support membrane. An aqueous solution containing 0.5 wt % of m-phenylenediamine was poured onto a surface of the reactive support membrane, followed by contacting and standing for 2 min, the excess solution was poured away, and a residual liquid on the surface was removed. Then, an n-hexane solution containing 0.05 wt % of trimesoyl chloride was poured onto the surface of the membrane, followed by contacting and standing for 1 min, the excess solution was poured away, and a residual liquid on the surface was removed. Then, the obtained membrane was subjected to heat treatment in a water bath at 50° C. for 10 min to obtain a reverse osmosis membrane without a reactive group on a support layer.

Example 9

Commercial polyether sulfone ultrafiltration membrane was used as a porous support membrane. The porous support membrane was immersed in an aqueous solution containing 10 wt % of diethylenetriamine, subjected to an amination grafting reaction at 90° C. for 24 hours and then taken out. A surface of the membrane was sequentially washed with anhydrous ethanol and deionized water to obtain a reactive support membrane containing amino on the surface. Then, an aqueous solution containing 0.1 wt % of piperazine was poured onto the surface of the reactive support membrane, followed by contacting and standing for 1 min, the excess solution was poured away, and a residual liquid on the surface was removed. Then, an n-hexane solution containing 0.01 wt % of trimesoyl chloride was poured onto the surface of the membrane, followed by contacting and standing for 0.5 min, the excess solution was poured away, and a residual liquid on the surface was removed. Then, the obtained membrane was subjected to heat treatment in a water bath at 50° C. for 5 min to obtain a separation membrane based on a reactive support layer, which was a nanofiltration membrane.

Example 10

Commercial polyether sulfone ultrafiltration membrane was used as a porous support membrane. The porous support membrane was immersed in an aqueous solution containing 15 wt % of diethylenetriamine, subjected to an amination grafting reaction at 90° C. for 72 hours and then taken out. A surface of the membrane was sequentially washed with anhydrous ethanol and deionized water to obtain a reactive support membrane containing amino on the surface. Then, an aqueous solution containing 0.1 wt % of piperazine was poured onto the surface of the reactive support membrane, followed by contacting and standing for 1 min, the excess solution was poured away, and a residual liquid on the surface was removed. Then, an n-hexane solution containing 0.01 wt % of trimesoyl chloride was poured onto the surface of the membrane, followed by contacting and standing for 0.5 min, the excess solution was poured away, and a residual liquid on the surface was removed. Then, the obtained membrane was subjected to heat treatment in a water bath at 80° C. for 20 min to obtain a separation membrane based on a reactive support layer, which was a nanofiltration membrane.

Example 11

Commercial polyether sulfone ultrafiltration membrane was used as a porous support membrane. The porous support membrane was immersed in an aqueous solution containing 15 wt % of ethylenediamine, subjected to an amination grafting reaction at 160° C. for 24 hours and then taken out. A surface of the membrane was sequentially washed with anhydrous ethanol and deionized water to obtain a reactive support membrane containing amino on the surface. Then, an aqueous solution containing 0.5 wt % of piperazine was poured onto the surface of the reactive support membrane, followed by contacting and standing for 5 min, the excess solution was poured away, and a residual liquid on the surface was removed. Then, an n-hexane solution containing 0.05 wt % of trimesoyl chloride was poured onto the surface of the membrane, followed by contacting and standing for 2.5 min, the excess solution was poured away, and a residual liquid on the surface was removed. Then, the obtained membrane was subjected to heat treatment in a water bath at 80° C. for 5 min to obtain a separation membrane based on a reactive support layer, which was a nanofiltration membrane.

Example 12

Commercial polyether sulfone ultrafiltration membrane was used as a porous support membrane. The porous support membrane was immersed in an aqueous solution containing 10 wt % of hexamethylenediamine, subjected to an amination grafting reaction at 160° C. for 48 h and then taken out. A surface of the membrane was sequentially washed with anhydrous ethanol and deionized water to obtain a reactive support membrane containing amino on the surface. Then, an aqueous solution containing 0.1 wt % of piperazine was poured onto the surface of the reactive support membrane, followed by contacting and standing for 10 min, the excess solution was poured away, and a residual liquid on the surface was removed. Then, an n-hexane solution containing 0.01 wt % of trimesoyl chloride was poured onto the surface of the membrane, followed by contacting and standing for 5 min, the excess solution was poured away, and a residual liquid on the surface was removed. Then, the obtained membrane was subjected to heat treatment in a water bath at 80° C. for 15 min to obtain a separation membrane based on a reactive support layer, which was a nanofiltration membrane.

Example 13

Commercial polyether sulfone ultrafiltration membrane was used as a porous support membrane. The porous support membrane was immersed in an aqueous solution containing 15 wt % of diethylenetriamine, subjected to an amination grafting reaction at 90° C. for 72 hours and then taken out. A surface of the membrane was sequentially washed with anhydrous ethanol and deionized water to obtain a reactive support membrane containing amino on the surface. Then, an aqueous solution containing 0.5 wt % of piperazine was poured onto the surface of the reactive support membrane, followed by contacting and standing for 10 min, the excess solution was poured away, and a residual liquid on the surface was removed. Then, an n-hexane solution containing 0.05 wt % of trimesoyl chloride was poured onto the surface of the membrane, followed by contacting and standing for 5 min, the excess solution was poured away, and a residual liquid on the surface was removed. Then, the obtained membrane was subjected to heat treatment in a water bath at 50° C. for 20 min to obtain a separation membrane based on a reactive support layer, which was a nanofiltration membrane.

Example 14

Commercial polysulfone ultrafiltration membrane was used as a porous support membrane. The porous support membrane was immersed in an aqueous solution containing 10 wt % of ethylenediamine, subjected to an amination grafting reaction at 90° C. for 24 hours and then taken out. A surface of the membrane was sequentially washed with anhydrous ethanol and deionized water to obtain a reactive support membrane containing amino on the surface. Then, an aqueous solution containing 0.5 wt % of piperazine was poured onto the surface of the reactive support membrane, followed by contacting and standing for 1 min, the excess solution was poured away, and a residual liquid on the surface was removed. Then, an isopar G solution containing 0.05 wt % of trimesoyl chloride was poured onto the surface of the membrane, followed by contacting and standing for 0.5 min, the excess solution was poured away, and a residual liquid on the surface was removed. Then, the obtained membrane was subjected to heat treatment in a water bath at 80° C. for 10 min to obtain a separation membrane based on a reactive support layer, which was a nanofiltration membrane.

Example 15

Commercial polyvinylidene fluoride ultrafiltration membrane was used as a porous support membrane. The porous support membrane was immersed in an aqueous solution containing 15 wt % of triethylenetetramine, subjected to an amination grafting reaction at 90° C. for 72 hours and then taken out. A surface of the membrane was sequentially washed with anhydrous ethanol and deionized water to obtain a reactive support membrane containing amino on the surface. Then, an aqueous solution containing 0.5 wt % of 2-methylpiperazine was poured onto the surface of the reactive support membrane, followed by contacting and standing for 5 min, the excess solution was poured away, and a residual liquid on the surface was removed. Then, a cyclohexane solution containing 0.05 wt % of o-phthaloyl chloride was poured onto the surface of the membrane, followed by contacting and standing for 2 min, the excess solution was poured away, and a residual liquid on the surface was removed. Then, the obtained membrane was subjected to heat treatment in a water bath at 80° C. for 5 min to obtain a separation membrane based on a reactive support layer, which was a nanofiltration membrane.

Example 16

Commercial polypropylene ultrafiltration membrane was used as a porous support membrane. The porous support membrane was immersed in an aqueous solution containing 15 wt % of ethylenediamine, subjected to an amination grafting reaction at 90° C. for 24 hours and then taken out. A surface of the membrane was sequentially washed with anhydrous ethanol and deionized water to obtain a reactive support membrane containing amino on the surface. Then, an aqueous solution containing 0.5 wt % of 2-methylpiperazine was poured onto the surface of the reactive support membrane, followed by contacting and standing for 2 min, the excess solution was poured away, and a residual liquid on the surface was removed. Then, an n-hexane solution containing 0.05 wt % of p-phthaloyl chloride was poured onto the surface of the membrane, followed by contacting and standing for 1 min, the excess solution was poured away, and a residual liquid on the surface was removed. Then, the obtained membrane was subjected to heat treatment in a water bath at 80° C. for 20 min to obtain a separation membrane based on a reactive support layer, which was a nanofiltration membrane.

Comparative Example 2

Commercial polyether sulfone ultrafiltration membrane was used as a porous support membrane. An aqueous solution containing 0.5 wt % of piperazine was poured onto a surface of the reactive support membrane, followed by contacting and standing for 2 min, the excess solution was poured away, and a residual liquid on the surface was removed. Then, an n-hexane solution containing 0.05 wt % of trimesoyl chloride was poured onto the surface of the membrane, followed by contacting and standing for 1 min, the excess solution was poured away, and a residual liquid on the surface was removed. Then, the obtained membrane was subjected to heat treatment in a water bath at 50° C. for 10 min to obtain a nanofiltration membrane without a reactive group on a support layer.

Figure 1:
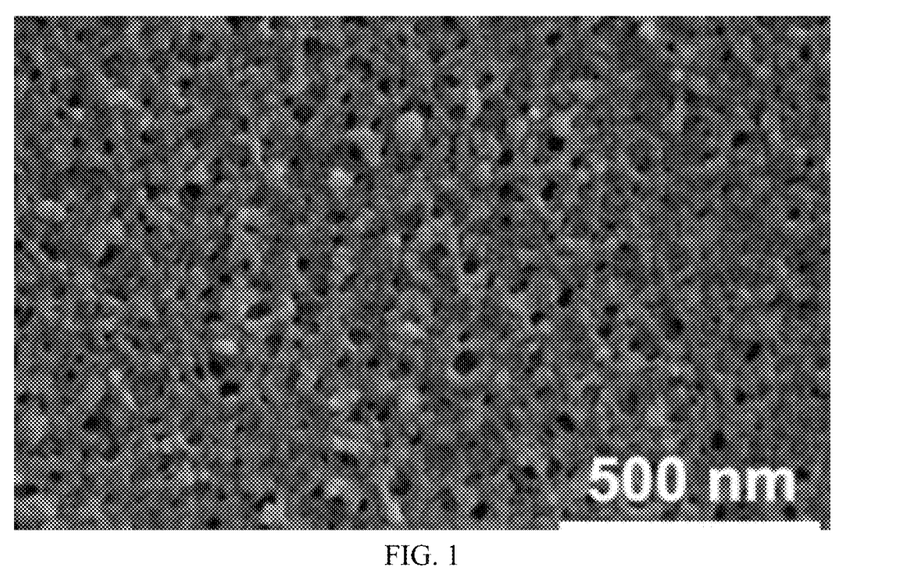
FIG. 1 is an SEM image of a reactive support membrane containing amino on a surface in Example 2.
Figure 2:
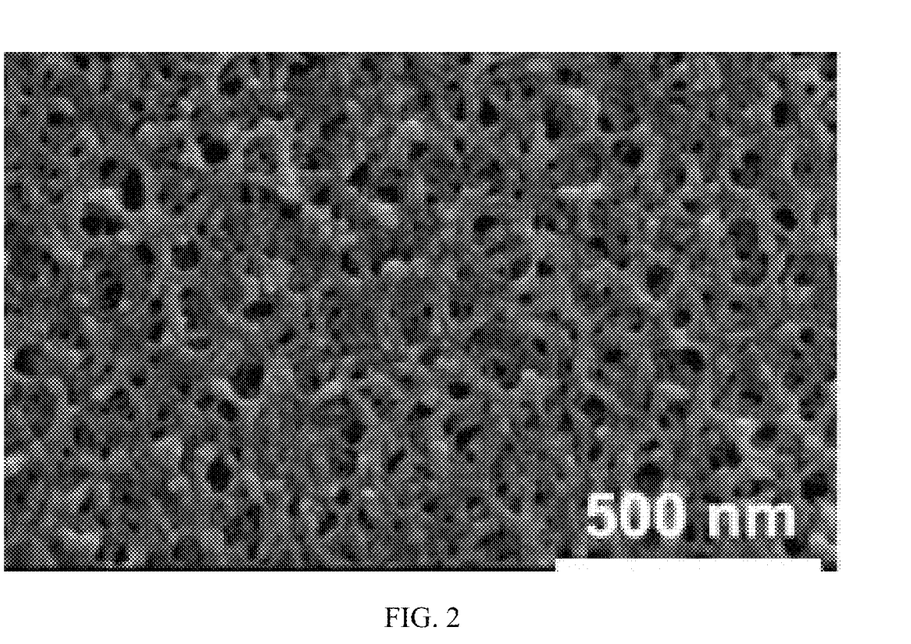
FIG. 2 is an SEM image of a porous support membrane in Comparative Example 1.

Sample Analysis (1) Analysis of Morphology and Performance of a Reverse Osmosis Membrane Based on a Reactive Support Layer The microscopic morphology of the reactive support membrane and the porous support membrane in Example 2 and Comparative Example 1 was analyzed, and results are as shown in FIG. 1 and FIG. 2, respectively. After a porous support layer is subjected to amination, a cross-linking structure thereof and the morphology of pores are not changed obviously, and the morphology of the porous support layer is similar to that of a support layer without amination as shown in FIG. 2.

The performance of the reverse osmosis membranes prepared in Examples 1-8 and Comparative Example 1 was tested by using a cross-flow flat membrane performance evaluation device at room temperature. The pure water flux and the retention rate for a 2,000 ppm NaCl aqueous solution of the product membranes were tested, respectively (at a test temperature of 25° C. and a test pressure of 15 bar), and results are as shown in Table 1.

TABLE 1

Performance test results of reverse osmosis membranes prepared in Examples 1-8 and Comparative Example 1

| Sample | Pure water flux ($L \cdot m^{-2} \cdot h^{-1}$) | Sodium chloride retention rate |
|---|---|---|
| Example 1 | 52.6 | 98.6% |
| Example 2 | 61.2 | 98.8% |
| Example 3 | 48.6 | 99.1% |
| Example 4 | 54.5 | 99.4% |
| Example 5 | 58.1 | 99.0% |
| Example 6 | 57.2 | 99.2% |
| Example 7 | 43.7 | 99.6% |
| Example 8 | 65.8 | 97.4% |
| Comparative Example 1 | 39.7 | 98.6% |

As shown in Table 1, through comparison between the examples and the comparative example, it is proved that by means of the method of the present invention, the pure water flux is increased obviously while the ion retention property of the reverse osmosis membranes is maintained. This is because due to the reactive support layer, a polyamide layer is prevented from infiltrating into pores of the support layer, the thickness of the polyamide layer is decreased, and the water permeability is improved.

Figure 3:
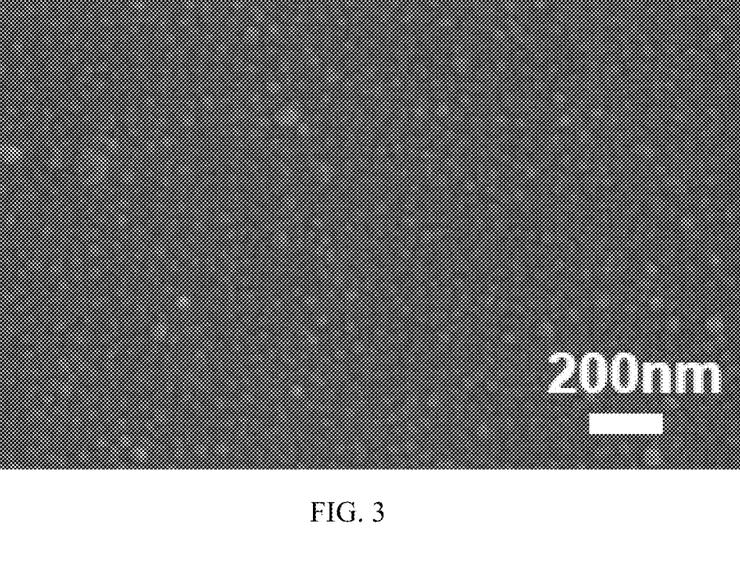
FIG. 3 is an SEM image of a surface of a separation membrane based on a reactive support layer in Example 9.
Figure 4:
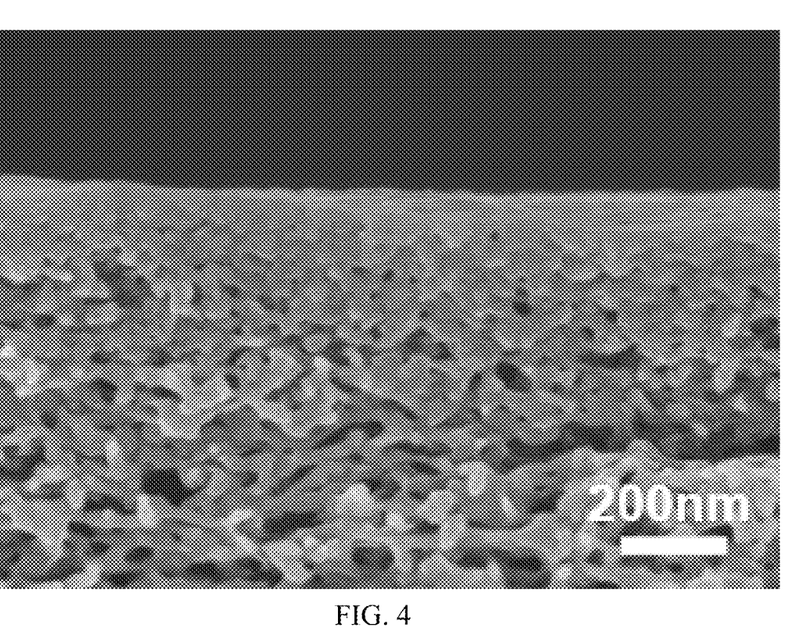
FIG. 4 is an SEM image of a cross section of the separation membrane based on a reactive support layer in Example 9.

(2) Analysis of Morphology and Performance of a Nanofiltration Membrane Based on a Reactive Support Layer The microscopic morphology of the nanofiltration membrane based on a reactive support layer prepared in Example 9 was analyzed. Surface SEM results and cross-section SEM results are as shown in FIG. 3 and FIG. 4, respectively. According to the nanofiltration membrane prepared after amination of the porous support membrane, a polyamide layer has a smaller and more uniform vesicular structure and a lower thickness.

The performance of the nanofiltration membranes prepared in Examples 9-16 and Comparative Example 2 was tested by using a cross-flow flat membrane performance evaluation device at room temperature. The pure water flux, the retention rate for a 2,000 ppm $Na_2SO_4$ aqueous solution and the retention rate for a 2,000 ppm NaCl aqueous solution of the product membranes were tested, respectively (at a test temperature of 25° C. and a test pressure of 5 bar), and results are as shown in Table 2.

TABLE 2

Performance test results of nanofiltration membranes prepared in Examples 9-16 and Comparative Example 2

| Sample | Pure water flux ($L \cdot m^{-2} \cdot h^{-1} \cdot bar^{-1}$) | $SO_4^{2-}$ retention rate | $Cl^-$ retention rate |
|---|---|---|---|
| Example 9 | 28.6 | 90.1% | 12.2% |
| Example 10 | 20.6 | 98.2% | 13.0% |
| Example 11 | 19.2 | 98.8% | 21.4% |
| Example 12 | 21.2 | 96.4% | 18.9% |
| Example 13 | 20.6 | 99.1% | 22.0% |
| Example 14 | 18.6 | 98.6% | 21.3% |
| Example 15 | 23.2 | 97.4% | 19.3% |
| Example 16 | 25.1 | 95.4% | 14.3% |
| Comparative Example 2 | 7.2 | 96.9% | 35.1% |

As shown in Table 2, through comparison between the examples and the comparative example, it is proved that the pure water flux of the nanofiltration membranes prepared by the method of the present invention is increased obviously. This is because due to the reactive support layer, a polyamide layer is prevented from infiltrating into pores of the support layer, the thickness of the polyamide layer is decreased, and the water permeability is improved. In addition, the nanofiltration membrane based on a reactive support layer in the examples has better monovalent/bivalent anion selectivity. This is because as the cross-linking degree of the polyamide layer in the examples is slightly lower than that in the comparative example, the polyamide layer of the nanofiltration membrane in the examples has a larger effective pore radius and a more negative membrane surface charge, thereby improving the ion selectivity of the nanofiltration membrane.

The technical schemes of the present invention have been described in detail through the above examples. It is to be understood that the examples described are only specific examples of the present invention and are not intended to limit the present invention. Any modifications, supplements or substitutions made in a similar manner within the scope of principles of the present invention are included within the scope of protection of the present invention.

The invention claimed is:

1. A method of preparing a reverse osmosis membrane, characterized in that the method comprises the following steps in the following order:
   (1) subjecting a porous support membrane to an amino grafting reaction to prepare a reactive support membrane, wherein the porous support membrane is immersed into a reaction solution containing an amino monomer to carry out the amino grafting reaction, wherein conditions of the amino grafting reaction are as follows: the temperature is 90-160° C., and the time is 24-72 hours;
   wherein the amino monomer is at least one of ethylenediamine, hexamethylenediamine, diethylenetriamine, triethylenetetramine, tetraethylenepentamine, pentaethylenehexamine and polyethyleneimine, and the amino monomer has a content of 10-15 wt % in the reaction solution containing an amino monomer; and
   (2) subjecting an aqueous phase solution and an oil phase solution containing a multi-membered acyl chloride oil phase monomer to interfacial polymerization on the reactive support membrane to prepare the reverse osmosis membrane;
   wherein an aqueous phase monomer in the aqueous phase solution is at least one of m-phenylenediamine, o-phenylenediamine, 1,3,5-trisaminobenzene, 1,2,4-trisaminobenzene, 3,5-diaminobenzoic acid, 2,4-diaminotoluene, 2,6-diaminotoluene, dimethylphenylene diamine, ethylenediamine, propylenediamine, tris(2-aminoethyl)amine, 1,3-diaminocyclohexane, 1,2-diaminocyclohexane and 1,4-diaminocyclohexane;

wherein the interfacial polymerization process for membrane preparation comprises:
1) first pouring the aqueous phase solution onto a surface of the reactive support membrane, subjecting the aqueous phase solution to contacting and standing for 1-10 minutes, and then removing an excess liquid on the surface of the reactive support membrane;
2) then pouring the oil phase solution containing a multi-membered acyl chloride oil phase monomer onto the surface of the reactive support membrane obtained in step 1), subjecting the oil phase solution to contacting and standing for 0.5-5 minutes, and then removing an excess liquid on the surface of the reactive support membrane; and
3) subjecting the reactive support membrane obtained in step 2) to heat treatment in a water bath to obtain a separation membrane based on a reactive support layer;

wherein the reverse osmosis membrane has a water flux of greater than 43 $L \cdot m^{-2} \cdot h^{-1}$ and a retention rate of greater than 97% for a 2,000 ppm sodium chloride solution.

2. The method of preparing a reverse osmosis membrane according to claim 1, wherein the porous support membrane is one of a polysulfone ultrafiltration membrane, a polyether sulfone ultrafiltration membrane, a polyacrylonitrile ultrafiltration membrane, a polyvinylidene fluoride ultrafiltration membrane, a polypropylene ultrafiltration membrane, a polyethylene ultrafiltration membrane, a polystyrene ultrafiltration membrane or a polyimide ultrafiltration membrane.

3. The method of preparing a reverse osmosis membrane according to claim 1, wherein in the oil phase solution, the multi-membered acyl chloride oil phase monomer is at least one of trimesoyl chloride, p-phthaloyl chloride, o-phthaloyl chloride, tetramesoyl chloride, malonyl dichloride, glutaryl chloride and fumaryl chloride.

4. The method of preparing a reverse osmosis membrane according to claim 1, wherein the aqueous phase monomer has a content of 0.1-0.5 wt % in the aqueous phase solution, and the multi-membered acyl chloride oil phase monomer has a content of 0.01-0.05 wt % in the oil phase solution.

5. The method of preparing a reverse osmosis membrane according to claim 1, wherein in step 3), the heat treatment in the water bath is performed at 50-80° C. for 5-20 minutes.

6. A reverse osmosis membrane made by the method of preparing the reverse osmosis membrane according to claim 1.

* * * * *